(12) United States Patent
Sullivan et al.

(10) Patent No.: US 11,671,435 B2
(45) Date of Patent: Jun. 6, 2023

(54) PROCESS FOR AUTOMATED INVESTIGATION OF FLAGGED USERS BASED UPON PREVIOUSLY COLLECTED DATA AND AUTOMATED OBSERVATION ON A GO-FORWARD BASIS

(71) Applicant: Code42 Software, Inc., Minneapolis, MN (US)

(72) Inventors: Daniel Louis Sullivan, Denver, CO (US); Rob Juncker, Lakeville, MN (US); Danaca Booth, Minneapolis, MN (US)

(73) Assignee: Code42 Software, Inc., Minneapolis, MN (US)

( * ) Notice: Subject to any disclaimer, the term of this patent is extended or adjusted under 35 U.S.C. 154(b) by 478 days.

(21) Appl. No.: 16/732,414

(22) Filed: Jan. 2, 2020

(65) Prior Publication Data
US 2021/0211443 A1 Jul. 8, 2021

(51) Int. Cl.
| | |
|---|---|
| H04L 29/06 | (2006.01) |
| H04L 9/40 | (2022.01) |
| G06N 5/04 | (2023.01) |
| G06F 16/21 | (2019.01) |
| G06N 20/00 | (2019.01) |

(52) U.S. Cl.
CPC ........ *H04L 63/1425* (2013.01); *G06F 16/219* (2019.01); *G06N 5/04* (2013.01); *H04L 63/1416* (2013.01); *G06N 20/00* (2019.01)

(58) Field of Classification Search
CPC ............. H04L 63/1425; H04L 63/1416; H04L 63/1408; G06F 16/219; G06N 5/04; G06N 20/00
See application file for complete search history.

(56) References Cited

U.S. PATENT DOCUMENTS

| | | | | |
|---|---|---|---|---|
| 9,015,843 | B2 * | 4/2015 | Griffin | G06F 21/56 |
| | | | | 726/25 |
| 2016/0234234 | A1 * | 8/2016 | McGrew | H04L 63/20 |
| 2018/0254895 | A1 * | 9/2018 | Castinado | H04W 12/041 |
| 2018/0288063 | A1 * | 10/2018 | Koottayi | H04L 67/22 |
| 2018/0332063 | A1 * | 11/2018 | Ford | H04L 63/1425 |
| 2019/0081967 | A1 * | 3/2019 | Balabine | H04L 67/535 |

(Continued)

*Primary Examiner* — Beemnet W Dada
*Assistant Examiner* — Ka Shan Choy
(74) *Attorney, Agent, or Firm* — Schwegman Lundberg & Woessner, P.A.

(57) ABSTRACT

A system for detecting anomalous user interactions with a computing resource a processor and a memory communicatively coupled to the processor and configured with instructions, which cause the processor to perform operations including receiving a request to monitor interactions of a user with the computing resource, obtaining first event data first event data that includes information that is indicative of first interactions of the user with the computing resource prior to receiving the request and obtaining second event data that includes information that is indicative of second interactions of the user with the computing resource after receiving the request. The operations further include determining, based on the first event data and the second event data, whether a deviation between the first interactions and the second interactions satisfies an indicated criteria. The operations additionally include generating a security alert based on the determination.

18 Claims, 6 Drawing Sheets

(56) References Cited

U.S. PATENT DOCUMENTS

2019/0182272 A1* 6/2019 Palumbo ................. G06N 5/048
2019/0356679 A1* 11/2019 Sites ....................... H04L 63/14
2020/0259852 A1* 8/2020 Wolff .................... G06F 21/566
2021/0126926 A1* 4/2021 Kaidi .................... H04L 43/062

* cited by examiner

PROCESS FOR AUTOMATED INVESTIGATION OF FLAGGED USERS BASED UPON PREVIOUSLY COLLECTED DATA AND AUTOMATED OBSERVATION ON A GO-FORWARD BASIS

TECHNICAL FIELD

Embodiments of the present disclosure relate generally to computer security, more particularly, but not by way of limitation, to detection of anomalous interactions with a computing resource.

BACKGROUND

Corporations, firms, business entities, and other institutions (hereinafter, "organizations") can manage distributed information technology infrastructures that provide computing and intellectual property resources to employees, clients, and other users. Organizations are typically obliged to invest a considerable amount financial and human capital in securing intellectual property resources from unauthorized access or removal from their possession. This is due, in part, to the numerous available data exfiltration vectors that make it easy or convenient to any employee legally, or illegally, to move data between computing resources. As a result, during the normal course of business, any employee that has access to the intellectual property resources of an organization is a potential risk to the security of those resources.

A given organization can make its intellectual property resources available to authorized user though one or more computing resources, such as user computing devices, computing servers, or hosted or network-based computing environments and storage systems. Such computing resources can be configured with filesystems having filesystem elements that facilitate the storage, manipulation, and communication of large amounts of data, such as the intellectual property resources.

BRIEF DESCRIPTION OF THE DRAWINGS

Various ones of the appended drawings merely illustrate example embodiments of the present disclosure and cannot be considered as limiting its scope. Additionally, the headings provided herein are merely for convenience and do not necessarily affect the scope or meaning of the terms used.

DETAILED DESCRIPTION

Figure 1:
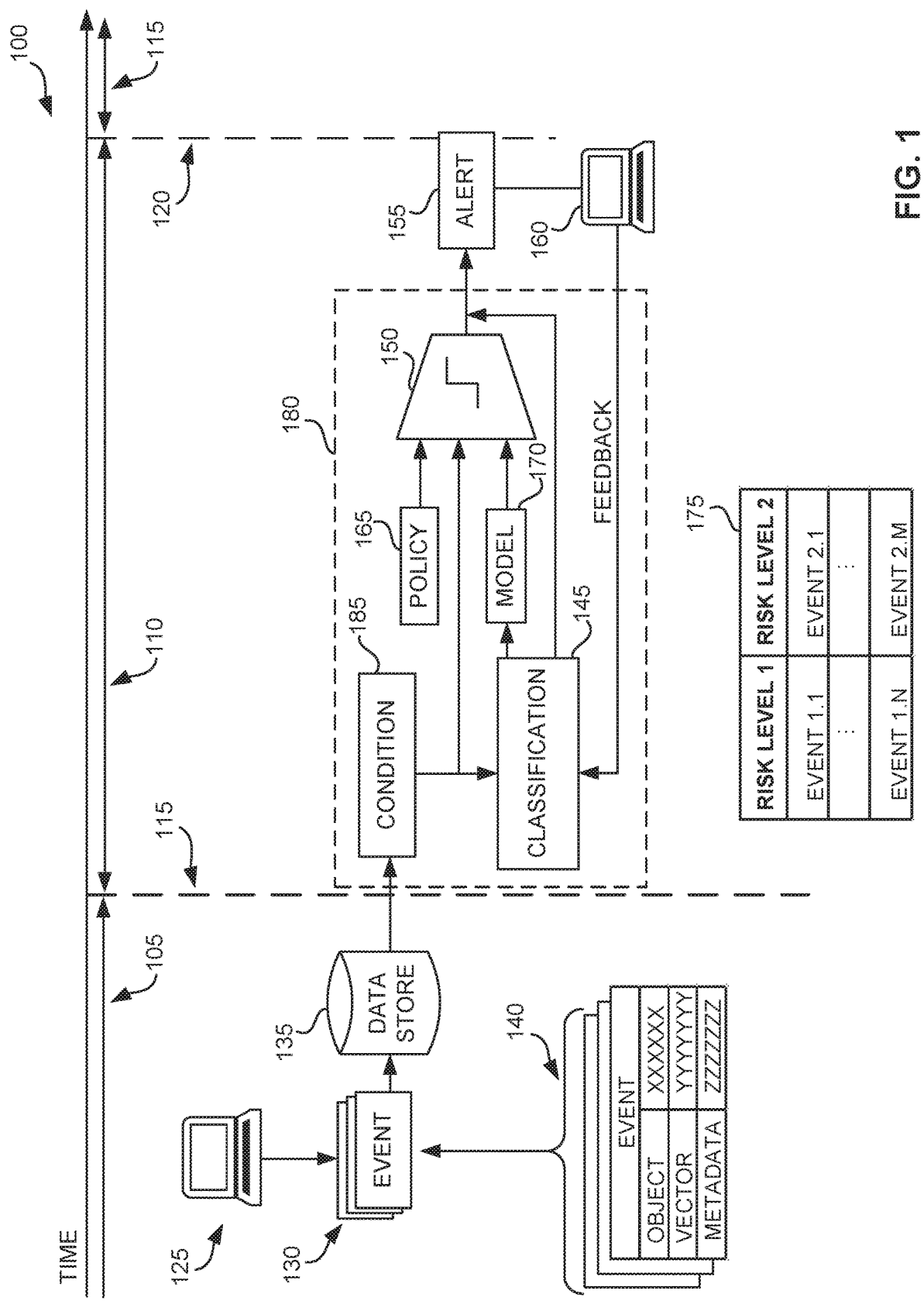
FIG. 1 illustrates a block diagram of a system for automated investigation of flagged users of a computing resource, according to some examples of the present disclosure.

Unauthorized exfiltration of intellectual property resources (e.g., the electronic data or software applications owned by an organization) by employees, clients, or other associates of an organization (hereinafter, "user" or "associate") is a costly and persistent security issue for some organizations. One technique for addressing this security issue includes continuously monitoring the computing resource usage of each associate and analyzing such usage to identify any activity or interaction that is indicative of an attempt to remove data or other intellectual property assets from the organization. Such monitoring and analysis, however, can be prohibitively expensive, both financially and analytically. In an example, continuously monitoring the computing resource usage of every associate of an organization during the normal course of business can cause the generation of such large volumes of data that the organization may be required to dedicate an impractical amount of its data storage and processing resources to the task. Additionally, manually sifting through such data to identify evidence of anomalous behavior can be an intractable task. Accordingly, it may not be practical to implement such techniques in a security platform.

Practical techniques for securing intellectual property resources from exfiltration by associates of an organization include reactive approaches that manually initiate investigations (e.g., monitoring computing resource usage and analyzing such usage to identify evidence that is indicative of data exfiltration activities) into an associate after the occurrence of a triggering event that causes the employee to be classified as an increased security risk. Examples of triggering events include voluntary or involuntary termination of the employee, the execution of high-risk actions that violate company policy (e.g., browsing prohibited websites), high-risk data movement activities such as copying data to removable media (e.g., a universal serial bus storage device, a compact disk, a digital video disk, or other external storage device). Other examples of triggering events include high-risk data exfiltration operations, such as sharing files externally to an organization, emailing files to a personal email address, transmitting files to remote computing systems, or sharing file to a personal data store, such as a cloud based storage account. In response to a triggering event, a security administrator of an organization (e.g., hereinafter, "administrator") can initiate an investigation into an associate by placing the associate into a policy where their interactions with computing resources of the organization is tracked (e.g., monitored and analyzed for evidence of suspicious behavior). The investigation can include manually assembling and analyzing information that is available about the employee prior to the triggering event, such as to identify anomalous activities in the associate's recent computing resource interactions.

The previously discussed practical techniques can suffer from a number of deficiencies that limit their utility as part of a data security platform. In an example, some techniques are implemented too late to prevent data exfiltration because an associate can remove data from an organization prior to the occurrence of a triggering event that initiates an investigation into the activities of the associate. In another example, the information collected about the activities of an associate prior to the occurrence of a triggering event is typically a limited subset of the information that will be prospectively collected after the triggering event. In another example, the volume of information collected by these techniques is often so large that manual analysis does not uncover any useful anomalies. In yet another example, the information collected about an associate after the occurrence of a triggering event is typically analyzed manually at certain time intervals. These analyses can miss, or delay the identification of, potentially high-risk activities that do not align with the analysis points.

Aspects of the present disclosure are based on the realization that file system event data that is collected by some data backup systems, such as the forensic file system discussed in U.S. patent application Ser. No. 16/360,273, which is titled "FORENSIC FILE SERVICE" and is hereby incorporated by reference, can be used to enhance the detection of high-risk computing system interactions. The file system event data (hereinafter. "event data") includes any data that is indicative of, or associated with, a data access event. A data access event includes one or more operations executed by a computing resource to access, process, or handle a data object. In an example, a data access event includes operations to transfer a data object (e.g., a file, archive, populated data structure, or other data object) to a removable storage device, a remote storage location (e.g., a cloud based storage), a personal email account, or other remote computing resource. In another example, a data access event includes operations to read, modify, copy, or delete selected data objects, such as data objects that are classified as being security sensitive or data objects that an associate is not authorized to access.

Examples of the present disclosure are directed to techniques (e.g., systems, methods, and machine-readable storage mediums) for using event data that is captured computing resources operated by associates of an organization throughout their tenure at the organization in automated investigations to enhance the detection of anomalous computing resource interactions. In an example, an anomalous computing system interaction (hereinafter, "anomalous event") includes any interaction with a computing resource that deviates for a normal or prescribed use of the resource, such as determined by a policy of an organization or the usage history of one or more users. The event data can be obtained by monitoring user interactions with a computing resource and capturing detected data access events and any associated contextual information or metadata that is useful for analyzing the interactions of a user with the computing resource. In some examples, the event data can be generated according to the techniques for generating filesystem events described in U.S. patent application Ser. No. 16/360,273. In an example, event data includes any relevant data that associated with a data access event, such as indicators of the data objects and computing resources (e.g., hardware device and software applications) associated with a data access event. In an example, data access events that are associated with a user of a computing resource are monitored to generate, or obtain, corresponding event data prior to the initiation of any investigation into the behavior of the user and may continue for as long the user is able to access computing resource of an organization.

An automated investigation can be initiated in response to the occurrence of a triggering event that changes the security risk level of the user. In an example, the automated investigation includes a retrospective process that analyzes event data that was obtained prior to the occurrence of a triggering event (hereinafter. "historical event data"), such as to identify anomalous events, such as interactions that pose a security risk or that may be indicative of a security breach.

In an example, the automated investigation includes a prospective process that uses historical event data to generate a model for predicting how a user will likely work with data or interact with computing resource of an organization in the future. The model can be used to automatically analyze prospective events that are captured after the occurrence of the triggering event, such as to detect any changes in the behavior of a user that may be indicative of security breach or security risk. A security alert is generated based on detected anomalous events or changes in the behavior of the user. Such security alerts can include any data that is useful for determining a security risk associated with the anomalous events or changes in the behavior of the user.

In an example, the automatic investigation includes classifying data access events, or event data that is indicative of the data access events, that are generated during a tenure of a user at an organization. Each data access event can be associated with a risk metric, such as a numeric risk value that is indicative of the amount of risk associated with the event. In an example, a relevant risk metric is evaluated according to a scale of numeric values ranging from 0-10. In such an example, a low-risk data access event can be associated with a numeric risk value of 0, while a high-risk data access event can be associated with a numeric risk value of 10. A data access event can be classified based on the numeric risk value and one or more provided or learned thresholds, conditions, or criteria. In the previous example where data access events are associated with a numeric risk value between 0 and 10, data access events that have a numeric risk value within the range 1-5 can be classified into a first risk category (e.g., a low-risk category), while data access events that have a numeric risk value within the range 6-10 can be classified into a second risk category (e.g., a high-risk category). In the same example, file system events that have a numeric risk value of 0 can be excluded from consideration as they may not provide any usable information for detecting anomalous events. In another example, a relevant risk metric can include a signal-to-noise ratio (SNR) of a data access event. The SNR of a data access event can provide an indication of the likelihood that the event is an anomalous event, or an indication of the likelihood that that the occurrence of the event is an indicator of a security breach or a security risk. The SNR of a data access event can include a ratio of the number of times an event has been confirmed as an anomalous event or associated with an actual security breach (e.g., the number of times an event has been used to identify an actual security breach) to the total number of time the event has occurred. A data access event can therefore be can be classified based on the SNR or the event and one or more provided or learned thresholds, conditions, or criteria. In an example, a data access event classified into a set of small SNR events or a set of large SNR events based on one or more SNR thresholds, conditions or criteria.

In an example, the automatic investigation includes generating an alert based on the classification of data access events. An alert can include any information about a suspected anomalous data access event that is useful for determining whether the event constitutes a security breach or a security risk. In an example, the alert can include a report of the operated associated with a data access event and identifiers of data objects, software resources, and hardware resources associated with those actions. The alert can be provided to a security administrator or other operator to analysis. The alert can also be used to adjust the status of an associate at an organization or to limit the data and computing resources that the associated is able to access.

In an example, the automatic investigation includes generating a risk factor for an associate based on the past interactions of the associate with computing resources of an organization or based on the data and computing resources to which the user has access. The past behavior of the associate can be identified from patterns of accessing, copying, or transferring data, such as indicated by data access events that were captured during their tenure at the organization. In an example, the risk factor is generated based on the classification of these historical data access events. In another example, the risk factor is generated based on the role or status of an associate at an organization. In an example, the risk factor is a combination of one or more metrics (e.g., a measure or quantitative indicator a data access event or a security risk associated with a data access event) used to classify historical data access events. In an example, the security risk factor includes a linear combination of the SNR of small SNR data access events, the SNR of large SNR data access events, and the status of the associate at the organization.

In an example, the automated investigation includes analyzing data access events that are generated after a triggering event to identify new anomalous or high-risk events and any changes in usage patterns that may be indicative of a security breach or a security risk. The automated investigation can provide updated information regarding usage patterns and security risks in the form of alerts or reports.

In an example, the automated investigation includes storing the generated alerts, classification, risk scores, and other security risk information and providing such information to an organization for analysis, such as to understand how their risk factors change or evolve over time.

As used herein, a computing resource can include any computing resource, such as an endpoint device (e.g., a user computing device), a computing server, a storage system, or a network-based or hosted computing environment (e.g., a virtual machine, cloud storage system, cloud messaging platform, cloud-based email systems, or other cloud-based computing environment).

Turning now to the figures, FIG. 1 illustrates a block diagram of a system 100 for automated investigation of flagged users of a computing resource, according to some examples of the present disclosure. In example, the system 100 includes an implementation of one or more of the described techniques for automated investigation or observation of a flagged user, such as an employee or an associate, based on data access events or corresponding event data that is obtained during the tenure of the user at an organization. The system 100 includes an associate computing resource 125, a data store 135, an investigation computing resource 180, and an administrator computing resource 160. Elements of the system 100 can communicate through a data communication network or any other suitable data communication channel.

The associate computing resource 125 can include any suitable computing resource, such as an endpoint device, a computing server, or network-based or hosted computing environment. The associate computing resource 125 can also include a computing environment, or a partition of a computing environment, that is allocated to a user of computing system. In an example, the associate computing resource 125 is used by an associate of an organization, such as an employee or client, to execute one or more tasks on the behalf of the organization. In an example, the associate computing resource 125 is configured with one or more software application to capture data access event and provide event data corresponding to those events to the data store 135. Capturing a data access event can include detecting operations executed on a filesystem element or other data object and generating event data 130 based on the detected operations.

Event data 130 can include event data that is associated with, or that is indicative of, a data access event that corresponds to an interaction with the associate computing resource 125. The data access event includes any operation to create, read, modify, or delete a data object. The data action event can also include any operation to copy or transfer a data object from one computing resource to another computing resource, such as copying or moving a file to removable storage device or uploading via a web browser. The event data 130 can also include data that is indicative of artifacts associated with a data access event, such as an identifier (e.g., a file name, a file path) of a data object associated with a data access event. Event data 130 can also include any other data or metadata associated with a computing resource or an operation executed on a data object associated with a computing resource. In an example, event data 130 includes identifiers of removable storage devices use to copy a data object from the associate computing resource 125. In an example, event data 130 includes an identifier of an application (e.g., an email client, a web browser, an instant messaging service, etc.), or a hardware resource (e.g., a network interface) used to transmit a data object to another computing resource. In an example, the event data 130 includes an identifier of a destination computing resource (e.g., a remote computing resource) or user account on hosted computing resource (e.g., an email or cloud storage account) to which a data object to transmitted.

The data structure 140 illustrates a sample of the information that can be included in event data 130. Such information can include an identifier of a data objected that is associated with a data access event and metadata associated with the operation. In cases where the operation is an exfiltration operation, the event data can also include an identifier of an exfiltration vector used to remove the data object from the associate computing resource 125. Examples of exfiltration vectors include hardware devices (e.g., removable storage devices or personal computing devices), cloud computing resources (e.g., cloud storage, social media, or hosted computing environments), and network based vectors such as a web browser, peer-to-peer applications (e.g., FTP), email and messaging services.

The data store 135 can include any data repository or storage system that is configured to process and store event data 130, such as described in U.S. patent application Ser. No. 16/360,273.

The investigating computing resource 180 can include any suitable computing resource that is configured with one or more circuits or software applications to process event data stored in the data store 135, such as to investigate the behavior of a flagged user, such as to identify anomalous events that are indicative of a security breach or security risk. The investigating computing resource 180 can include a conditioning component 185, classification component 145, and an analytic component 150.

The conditioning component 185 is configured to retrieve event data from the data store 135 and condition the retrieved data for further analysis. In an example, the conditioning component 185 can generate a query, such as by using a database query language that is compatible with the data store 135 (e.g., a database server associated with the data store), to retrieve event data that is associated with a flagged user or one or more other users. The query can include one or more search conditions for matching tables or records in the data store 135. The search conditions can be selected to retrieve tables or records that store information that this useful for analyzing the behavior of the flagged user. In an example the search condition can be provide by an administrator and may be specially configured to according a security profile of the organization. The security profile can include any information that is useful for identifying data access events, data objects, or exfiltration vectors that an organization considers to be security sensitive. In another example, the elements or terms of the search condition can be learned, such as by using machine learning techniques and feedback from the operator system 160 to optimize the usefulness of the event data for detecting security risks. In an example conditioning component 185 is configured to condition the retrieved event data by associating numeric values elements of the event data according to one or more metrics. In an example, the metrics and their associated numeric values are provided by an administrator. In another example, the metrics and their associated numeric values are learned or derived from event data, such as by using one or more machine techniques or algorithms. The conditioned event data can be provided to classification component 145 or to analytic component 150.

In some examples, the conditioning component 185, or the operations or processes performed by the conditioning component, can be included in, or performed by, one or more components of the data store 135 or any component of the investigation computing resource 180.

The classification component 145 is configured to classify event data that is retrieved from the data store 135 according to one or more learned or provided classification criteria or thresholds. In an example, the criteria is categorical, such that the retrieved event data, or corresponding data access events, is allocated to a risk category based on a categorical metric, such as a type of operation executed in the data access event (e.g., reading or copying a data object), the data objects accessed in the event (e.g., file types, such as source code, client records, financial documents, or design documents), the hardware or software resources used in the event (e.g., a removable storage device, a network communication interface, a data compression application, or communication software), or the status of the associate that generated the event (e.g., a job title, data access privileges, or security risk rating). In an example, event data that indicates that a software engineer at an organization printed a source code file may be classified as a low-risk interaction, while event data that indicates that the same software engineer printed a file containing the financial records of the largest customers of the organization may be classified as a high-risk activity. In an example, the categorical classification criteria are provided by an organization as a list of data access events that belong to a specified risk category. In another example, the categorical classification criteria can be learned from the aggregated historical event data one or more users.

A classification threshold can include one or more numeric thresholds for allocating event data to risk category. The classification thresholds can be derived from, or based on, any suitable metric, such as an SNR or a custom metric provided by an organization, used to measure the security risk of a data access event. In an example a numeric classification threshold can include ranges of SNR values that are associated one or more risk categories.

In an example, the classification component 145 can classify retrieved event data into one or more risk categories using machine learning based classification techniques, such as support vector machines, k-nearest neighbor, decision tree, neural networks, or linear classifier algorithms.

The investigating computing resource 180 or the classification component 145 can be configured to generate an alert based on the allocation of event data or data access events to one or more risk categories. In an example, the investigating computing resource 180 or the classification component 145 can generate an alert for all instances of data access events that are allocated to a high-risk or large SNR category. In another example, the investigating computing resource 180 or the classification component 145 can generate an alert after a threshold number of instances of a particular data access event or a particular combination of data access events data is accumulated in a low-risk or small SNR category.

In an example, the classification component 145 can receive feedback from an administrator or a computing resource operated by an administrator, such as through the administrator computing resource 160. In an example, the feedback includes an indication of how successful the classifications provided by the classification component 145 were at detecting, or providing evidence of, actual anomalous activities or security breaches. In an example, such feedback includes an indicator of a changed security risk of an associate, such as in response to a changed status of an associate due to, for example, risky data handling (such as a failed phishing exercise), performance issues or reported dissatisfaction with the associate, or a role change that grants the associate access to higher-level privileges, such as access to sensitive data. Such feedback can be used to automatically adjust the classification criteria, thresholds, metrics, or machine learning algorithms used by the classification component 145. In an example, such adjusting includes scaling or offsetting numerical values used by the classification component 145 to evaluate or classify event data. In another example, such adjusting includes changing the type of metric or the thresholds or criteria used to evaluate a metric used by the classification component.

The analytic component 150 includes one or more circuits or software applications that is configured to analyze historic event data to identify patterns in the data and use the identified patterns to detect deviations in an associate's interactions with a computing resource that may be indicative of a security risk. In an example, the patterns include indications of the types of data objects with which an associate typically interact, the type of hardware or software resources typically used by the associate, the type of operations generally executed in the interactions, the volume of data involved in the interactions, or the frequency with which a particular type of interaction occur. In an example the patterns indicate that it is common or normal for a user to print or transmit copies of an indicated type of document over a data communication interface. In another example, the patterns indicate that it is unusual for a user to use compression software or to copy more than a threshold number of files or volume of data to a removable storage device within an indicated period of time. The patterns can include any other data access event or interaction pattern that is useful for characterizing and understanding the behavior of an associate.

The investigating computing resource 180 uses the identified patterns to detect deviations in the behavior (e.g., data access events or computing resource interactions) of an associate by generating, based on the identified patterns, one or more analytical models 170 for predicting how a user will interact with a computing resource, or data objects (e.g., data sources) accessible through the computing resource, in the future. In an example, the analytical model 170 is a regression model that includes one or more terms or coefficients that are derived from historic event data, the identified patterns, or an operator or organization provided parameter. In an example, the analytic component 150 uses the analytical model 170 to generate one or more predictions of how an associate will likely work or interact with a computing resource in the future. The analytic component 150 evaluates the prospective event data that is captured after an investigation into the behavior of an associate is initiated against the predictions of the model 170 to identify changes in the behavior of the associate. In an example, the analytical model is generated based on the history of the user or the history (e.g., historic event data) of one or more other users. Evaluating the model can include providing new event data to the model to generate a risk score, similarity or dissimilarity value, or any other metric that is indicative of changes in the behavior of the user. The identified changes can be evaluated against a provided threshold or criteria to determine whether to generate an alert. In an example, an alert can be generated when the analytical model indicates the behavior of the user abnormally deviates their past behavior, such as when as user accesses a data source that they have never accessed or performs a data transfer operation that he has not previously performed.

The policy 165 can include a request, or a directive, from an operator or an organization to track or monitor the behavior of an associate. The policy 165 can trigger the classification component 145 or the analytic component 150 to execute the classification and analytic processes described herein.

The administrator computing resource 160 can include any suitable computing resource that is configured with one or more hardware circuits or software application to interface with the investigating computing resource 180, such as to initiate an investigation of an associate of an organization, to receive and process security alerts, or to provide feedback other information for actuating the system 100.

In operation, the system 100 captures event data 130 generated by the associate computing resource 125 during the time period 105 and 110 (e.g., a period during which a flagged associate, or one or more other associates, have access to the computing resources of an organization). The event data 130 includes information that is indicative of data access events generated by data access operations executed by the associate computing resource 125. In an example, the event data 130 includes any information or data necessary to process and analyze the actions or behavior of the associate to detect dangerous behavior (e.g., behavior that is indicative of a security breach or a security risk). The event data 130 is transmitted to the data store 135 where they processed, such as to enable the event data to be efficiently stored and queried for further analysis. At time 115, a triggering event causes the system 100 or the administrator computing system 160 to place the associate in a policy (e.g., to flag the associate for investigation) where their behavior is tracked and analyzed with heighted scrutiny. During time period 110, while the associate is in the policy, an automated investigation process is initiated. The automated investigation process causes the classification component 145 to analyze historical or retrospective event data (e.g., event data that was captured during the time period 115) to identify anomalous data access events executed by the associate. Retrospective events that are classified by the classification component 145 as into a specified risk category (e.g., high-risk or large SNR risk category) are reported in an alert 155. The retrospective events are also used to generate a model 170 for predicting the how the associate will likely interact with the associate computing resource 125 in the future. The analytic component 150 evaluates the predictions of the modeled 170 against prospective events (e.g., events that are captured after the triggering event, or after the associate is placed in a policy) that are captured by the system 100 during the time period 110 to identify any changes in the behavior of the associate that may be indicative of a security risk or a security breach. The identified changes in the behavior of the associate and information concerning the prospective events that are associated with the changes are transmitted to the administrator computing resource 160 in a report or alert 155.

In an example, generating an alert to can include generating a security risk factor for the associate. In an example, the security risk factor includes a linear combination of the SNR or low-risk retrospective event data, the large SNR or high-risk retrospective event data, and the status of the associate at the organization.

In an example, one or more components of the system 100 can identify or determine a change in a security risk of the user, such as based on feedback received from the administrator computing resource 160 or based on the identified changes in the behavior of the associate and the information concerning the prospective events that are associated with the changes. The system 100 can then adjust, based on the change in the security risk of the user, one or more of the metrics, numeric values, or processes, used to identify any changes in the behavior of the associate that may be indicative of a security risk or a security breach.

In an example, system 100 continues the prospective event data collection, analysis, and alerting for a time after the user leaves the organization at time 120.

Figure 2:
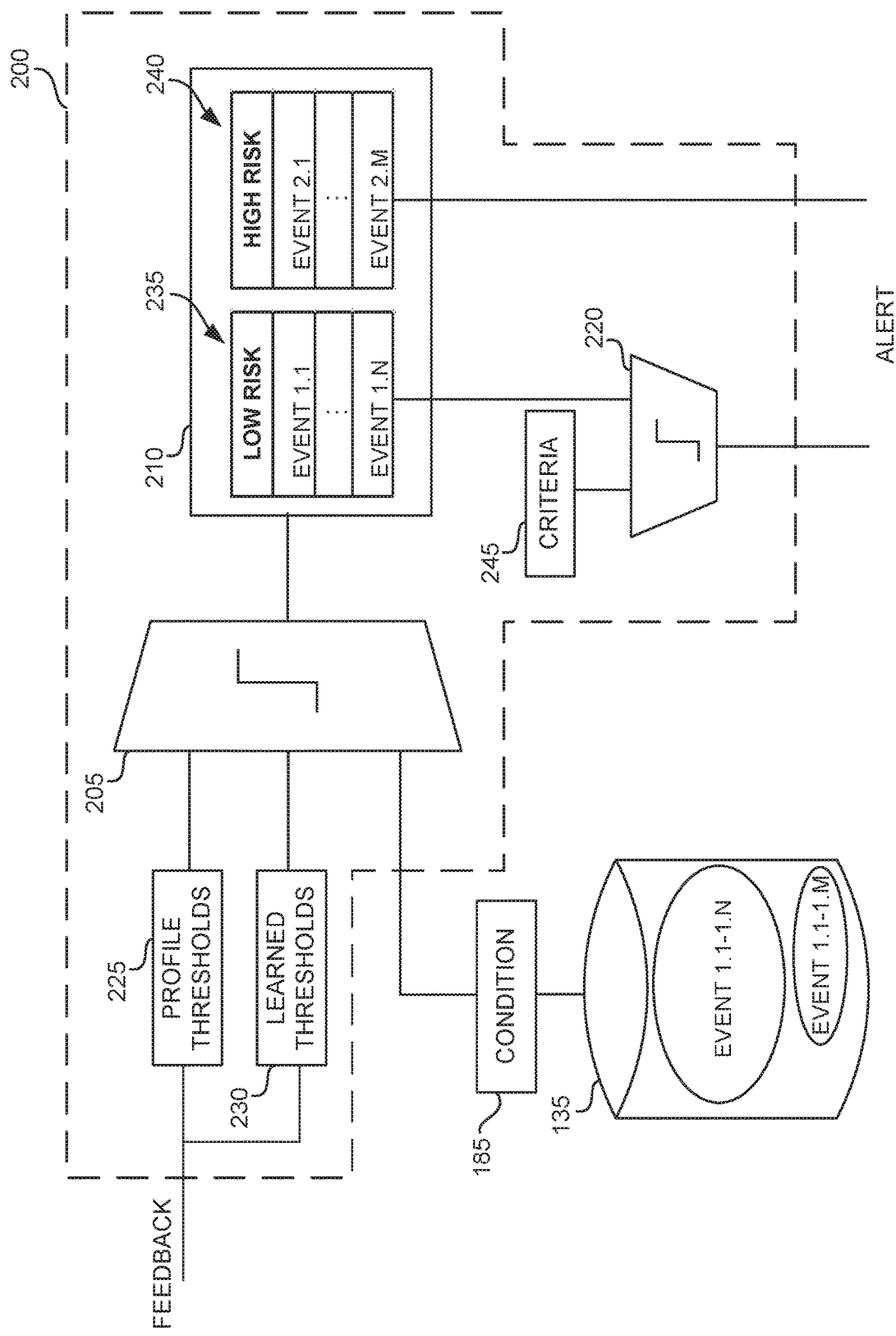
FIG. 2 illustrates a block diagram of a classification component for classifying events in a system for automated investigation of flagged users of a computing resource, according to some examples of the present disclosure.

FIG. 2 illustrates a block diagram of a classification component 200 for classifying event or data access events in a system for automated investigation of flagged users of a computing resource, according to some examples of the present disclosure. The classification component 200 can be an example of the classification component 145, as shown in FIG. 1. As shown in FIG. 2, an analytical component 205 can receive retrospective event data from the data store 135 or from the conditioning component 185 and generate a classification 210 for the received event data. In an example, the classification 210 includes an allocation of the received events between two or more risk categories, such as low-risk category 235 (e.g., a small SNR category) and a high-risk category 240 (e.g., a large SNR category), based on the tendency or likelihood of data access events corresponding to the event data is associated with, or provides evidence of, actual security breaches or other security risks.

In an example, the received event data is classified based on one or more profile thresholds 225 provided in, or associated with, a profile of an organization. As described herein, the profile thresholds can include one or more categorical criteria or numeric thresholds for classifying event data. In another example, the received event data is classified based on one or more learned thresholds 230. The profile thresholds 225 or the learned thresholds 230 can be automatically adjusted based on feedback received from an administrator or an organization. In an example, adjusting the thresholds can increase or decrease the likelihood of allocating event data or corresponding data access events to one or more risk categories.

The classification component 200, or another component of the investigating computing resource 180, can automatically generate an alert including any event data or data access event that is allocated to a specified risk category, such as the high-risk category 240. The classification component 200, or another component of the investigating computing resource 180, can also accumulate events in a specified risk category and generate an alert in response to an analytical component 220 determining that a threshold amount of event data or data access events are allocated to the category. The alert can also be generated in response to an analytical component 220 determining that a specified reporting criteria 245 is satisfied.

Figure 3:
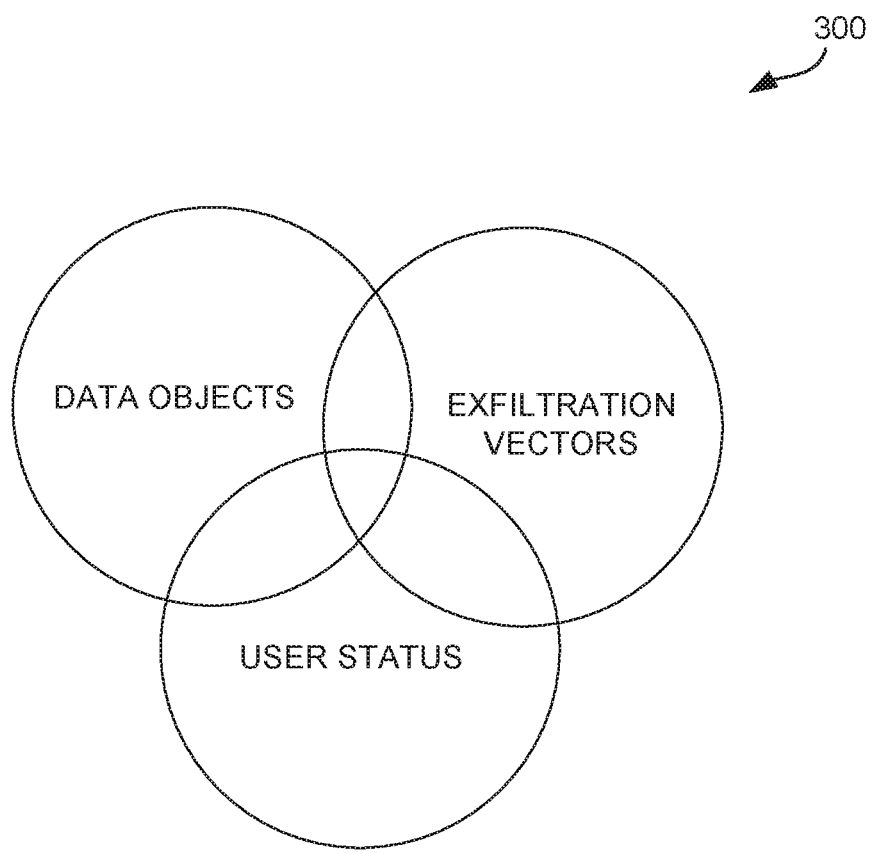
FIG. 3 illustrates diagram of factors for classifying events in a system for automated investigation of flagged users of a computing resource, according to some examples of the present disclosure.

FIG. 3 illustrates diagram of factors 300 for classifying event data or data access events in a system for automated investigation of flagged users of a computing resource, according to some examples of the present disclosure. One or more of the factors shown in FIG. 3 can be a basis for allocating event data or data access event to a given risk category, such as discussed in the description of FIGS. 1-2. In an example, each of the factors 300 can be associated with a numeric risk value, and the determination of whether that event data or a data access event is above or below threshold is determined based on a value that is derived from the risk values of associated with one or more of the factors 300. In an example, a source code file (e.g., a data object) can have a numeric risk value of 4, a removable storage device (e.g., an exfiltration vector) can have a numeric risk value of 5, and a full time software engineer (e.g., a user status) can have a numeric risk value of 1. To determine whether an event data that indicates that the software engineer copied a source code file to a removable storage device should be allocated to a high-risk category, a value that is derived from the factors indicated in FIG. 3 (e.g., a sum, or any other mathematical function of 4, 5, and 1) can be calculated and compared to a specified threshold value. In some examples, risk values derived from two or more data access event events can be combined to determine the allocation of the events.

In some examples, the factors 300 can be categorical, and the mere presence of one or more of the factors (e.g., elements of the factors) can be aggregated and used to determine the classification of the event data.

Figure 4:
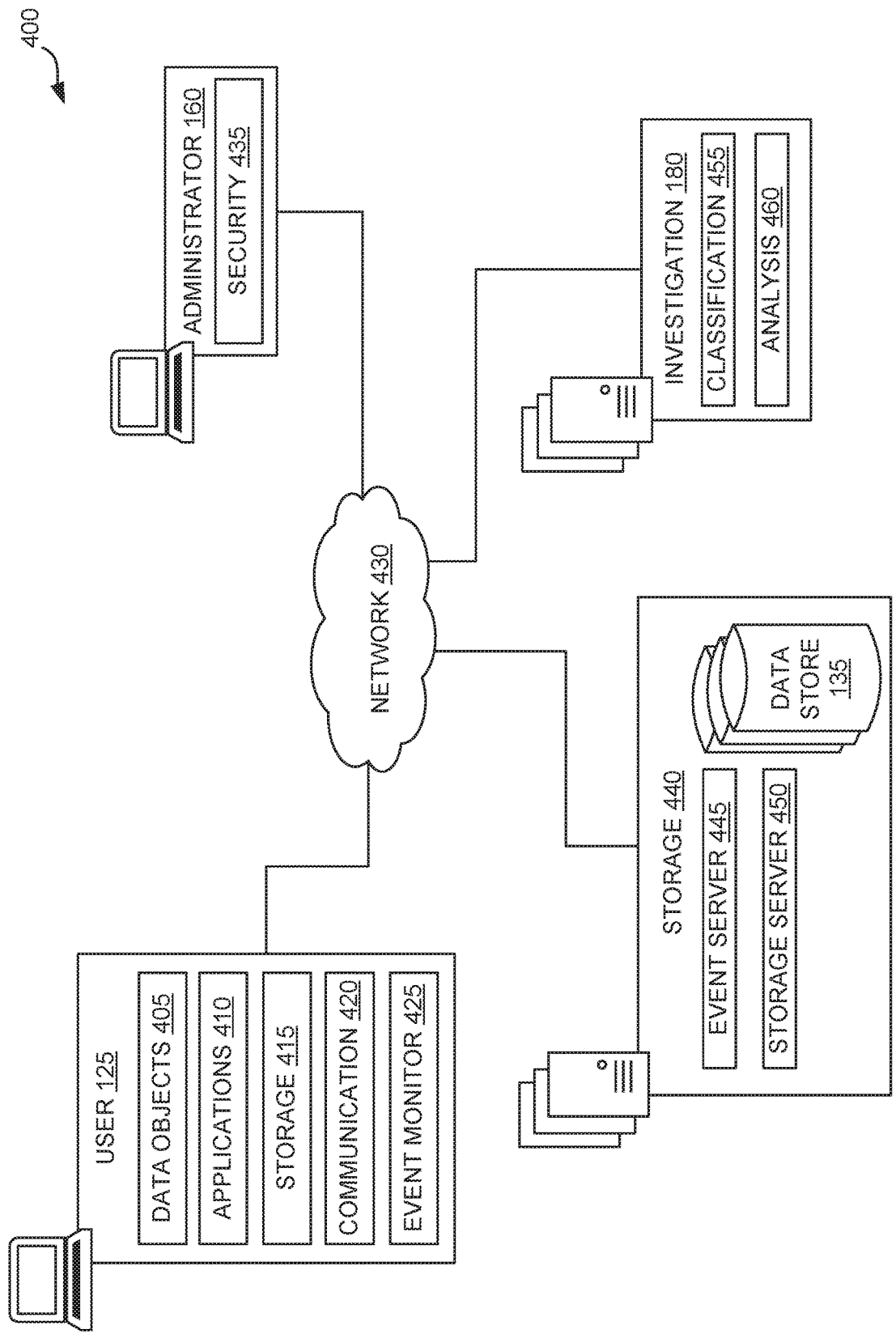
FIG. 4 illustrates a diagram of a system 400 for automated investigation of flagged employees, according to some examples of the present disclosure.

FIG. 4 illustrates a diagram of a system 400 for automated investigation of flagged users of a computing resource, according to some examples of the present disclosure. The system 400 is an example of the system 100, as shown in FIG. 1. The system 400 includes associate computing resource 125, storage system 440, investigating computing resource 180, and administrator computing resource 160. As shown in FIG. 4, the elements of the system 400 can communicate using any suitable data communication channel, such as the data communication network 430.

The associate computing resource 125 includes an event monitor application 425 that is configured to generate event data when an associate accesses data objects 405, such as by reading, writing, copying, or deleting a file using software application 410. The event data is also generated event data when an associate accesses data objects 405 by transferring the data object to a removable storage device or over the communication interface 420 the remote computing resource. The event monitor 425 can transmit the generated event data to the storage system 440 by interfacing with the event server 445 using the data communication network 430.

The storage system 440 can process the event data, as described herein, and provide the processed event data to data store 135 though the storage server 450. The investigating computing resource 180 includes a classification application 455 and an analysis application 460 that interfaces with the storage server 450 and the administrator computing resource 160 to implement the operations of the classification component 145 and the analytic component 150, respectively. The administrator computing resource 160 includes a security application 435 that is configured to received and analyze alerts provided by the investigating computing resource 180, as described herein.

Figure 5:
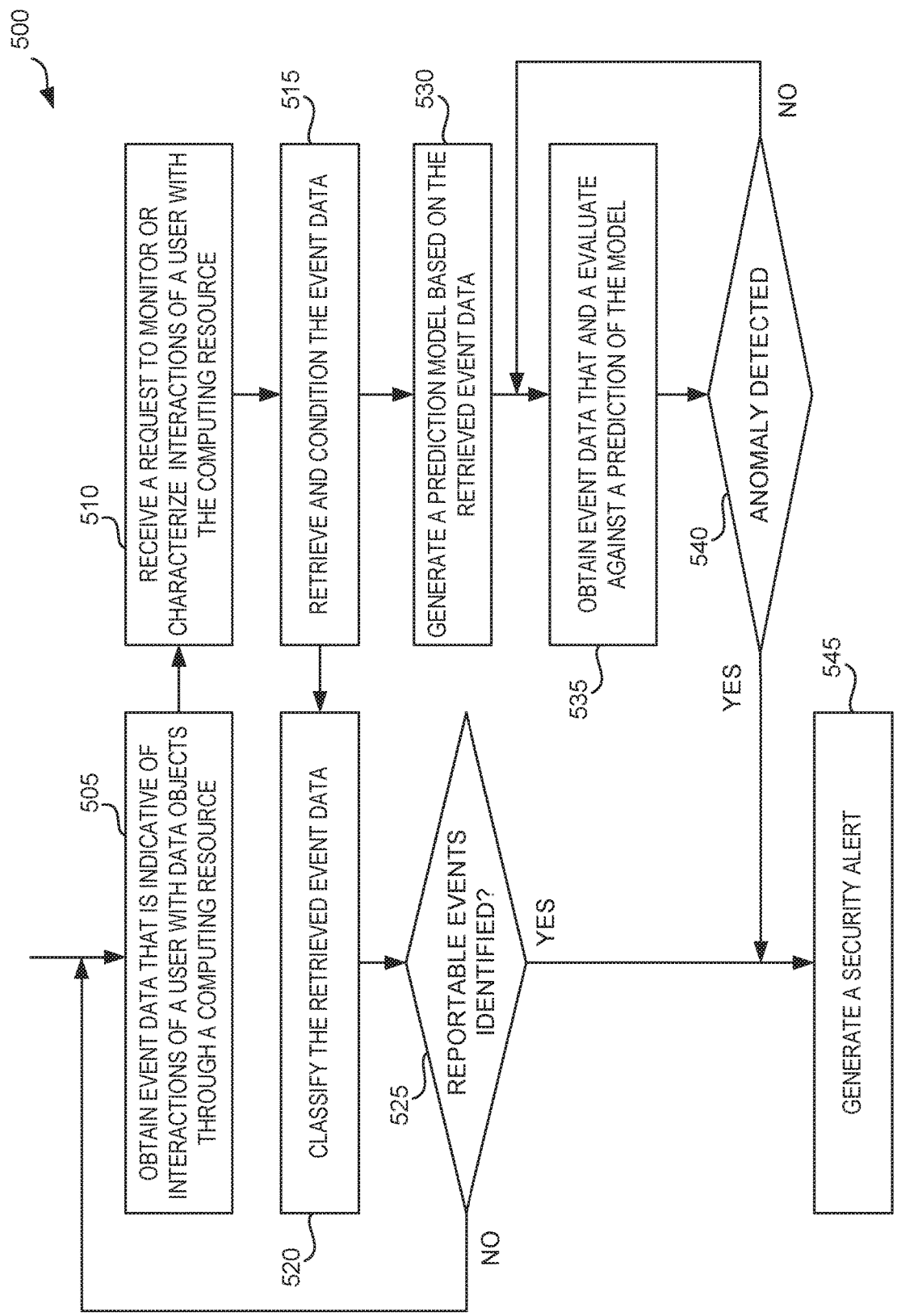
FIG. 5 illustrates an example of a process 500 for automated investigation of flagged users of a computing resource.

FIG. 5 illustrates an example of a process 500 for automated investigation of flagged users of a computing resource, according to some examples of the present disclosure. The process 500 can be executed by one or more components of the system 100 or the system 400 to implement or execute the techniques described herein.

At 505, event data is obtained from one or more computing resources, such as the associate computing resource 125. In an example, the event data is indicative of interactions of a user (e.g., an associate of an organization) with data objects, such as files, of the computing resource. In an example, obtaining the event data includes continuously monitoring the computing resources to detect operations to access or modify a data object. In another example, obtaining the event data includes continuously monitoring the one or more computing resources to detect operations to transfer a data object to a remote computing resource or to copy the data object to a removable storage device. The event data can be processed to improve storage and querying efficiency in a data store.

At 510, a request to monitor the user is received, such as from the administrator computing system 160. The request can include a directive to place the user in a policy where interactions of the user with the computing resources are monitored to detect changes in the behavior of the user that may be indicative of a security breach or a security risk (e.g., an increase or decreased security risk). In an example, the request is received in response to the occurrence of a triggering event that changes the security risk level, or the security risk factor, of the user. In an example, the triggering event is data access event that deviates from a pattern of data access events generated by interactions of the user, or the interactions of one or more other users (e.g., peers of the flagged user), with the computing resources. In an example, the triggering event is any other event or action of the user that is indicative of a change in the security risk on the user. In an example, receiving the request includes detecting a triggering event.

At 515, event data associated with the user is retrieved from the remote data store. In an example, the retrieved event data includes historical or retrospective event data that was captured in events generated before the triggering event. In another example, the retrieved event data includes prospective event data that is captured after the triggering event. In an example, the retrieved event data is conditioned as described herein.

At 520, the retrieved event data (e.g., retrospective event data) is classified based on one or more learned or provided metrics, thresholds, or conditions. In an example, the retrieved event data is classified based on an SNR of the data, as described herein. In an example, the retrieved event data is allocated between two or more risk categories that are indicative of a risk associated with data access events corresponding to the event data. In an example, the retrieved event data is allocated between two or more risk categories that are indicative of the usefulness of the data for identifying or predicting a security breach or a security risk.

At 525, it is determined whether a reportable event (e.g., an anomalous data access event) was identified by the classification. In an example, a reportable event includes any event that satisfies a criteria or threshold for generating a security alert, as described herein. The process 500 can continue at 545 when a reportable event is detected, while the process can return to 505 when a reportable event is not detected.

At 545, a security alert is generated and transmitted to an organization of administrator, such as the administrator computing resource 160. In some examples feedback can be received from the administrator computing resource 160 in response to the security alert. The feedback can be used to adjust the classification at 520, as described herein.

At 530, an analytical model (e.g., a predictive model) is generated based on the retrieved event data (e.g., historical or retrospective event data). In an example, the analytical model is a regression model that includes one or more terms or coefficients that are derived from the historical event data, such as patterns identified in the historical event data.

At 535, prospective event data that is indicative of interactions of the user, or one or more other users, with the one or more computing systems after the triggering event is obtained.

At 540, the prospective event data is evaluated against predictions made by the analytical mode to identify any anomalies or changes in the behavior of the user, such as compared to the predictions or data access events of other users. The process can continue at 545 when an anomaly or change in the behavior of the user is identified, while the process can return to 535 when no anomaly or change in the behavior of the user is identified.

The process 500 can include any other steps or operations for implementing the techniques described herein.

While the operations in FIG. 5 are shown as happening sequentially in a specific order, in other examples, one or more of the operations may be performed in parallel or in a different order. Additionally, one or more operations may be repeated two or more times.

Figure 6:
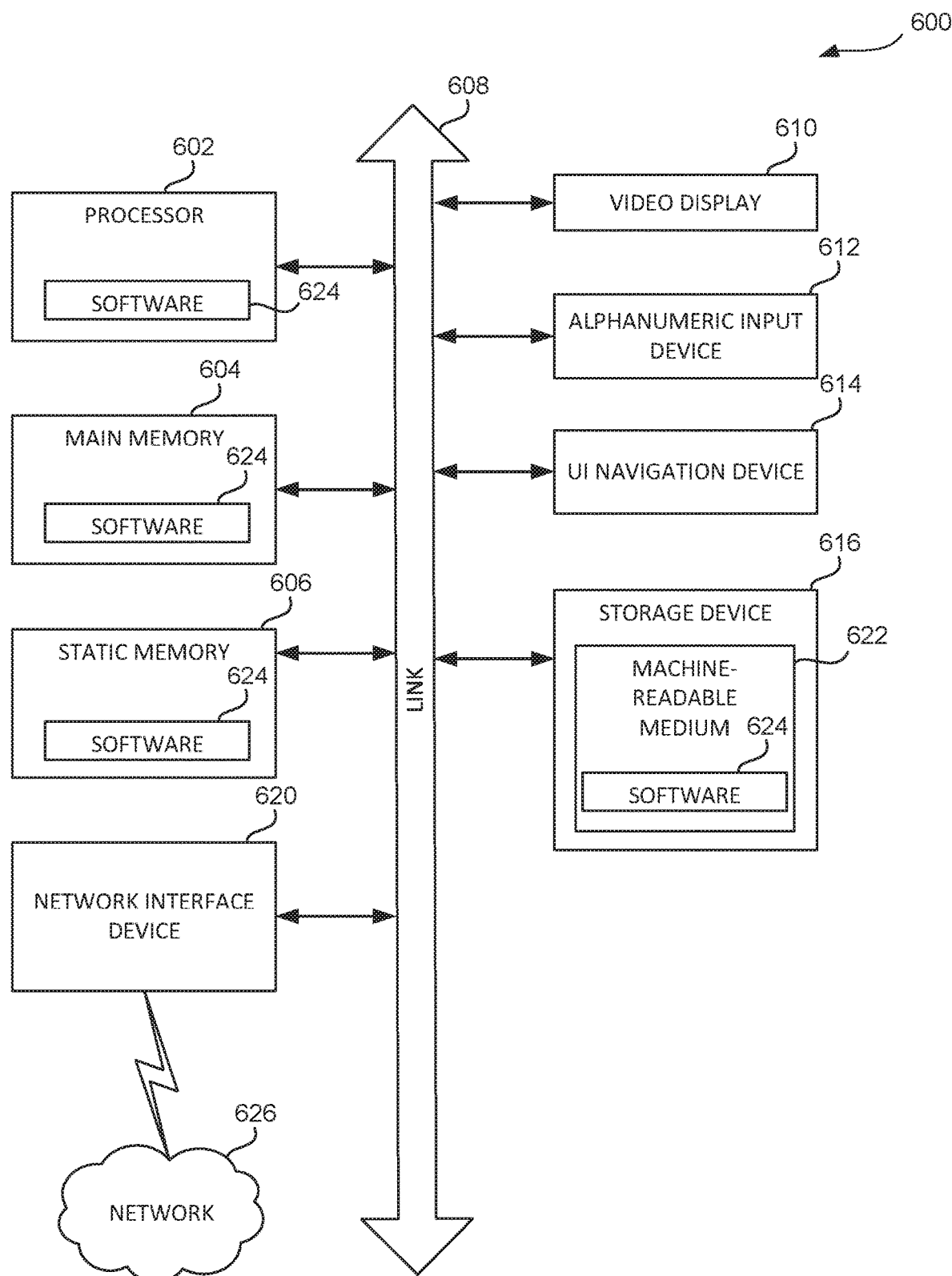
FIG. 6 illustrates a diagrammatic representation of a machine in the form of a computer system within which a set of instructions may be executed for causing the machine to perform any one or more of the methodologies discussed herein, according to an example embodiment.

FIG. 6 illustrates a diagrammatic representation of a machine in the form of a computer system within which a set of instructions may be executed for causing the machine to perform any one or more of the techniques or methodologies discussed herein, according to an example embodiment. The computer system 600 is an example of one or more of the computing resources discussed herein.

In alternative examples, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a vehicle subsystem, a personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one example, the video display unit 610, input device 612 and UI navigation device 614 are incorporated into a touch screen display. The computer system 600 may additionally include a storage device 616 (e.g., a drive unit), such as a global positioning system (GPS) sensor, compass, accelerometer, gyrometer, magnetometer, or other sensor.

The storage device 616 includes a machine-readable medium 622 on which is stored one or more sets of data structures and instructions 624 (e.g., software) embodying or utilized by any one or more of the methodologies or functions described herein. In an example, the one or more instructions 624 can constitute an event monitor application 425, the security application 425, the event server, 445, the classification application 455, or the analysis application 460, as described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media While the machine-readable medium 622 is illustrated in an example to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any example herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

"Circuitry," as used in any example herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some examples, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some examples, the processor circuitry may be embodied as a stand-alone integrated circuit or may be incorporated as one of several components on an integrated circuit. In some examples, the various components and circuitry of the node or other systems may be combined in a SoC architecture.

The above detailed description includes references to the accompanying drawings, which form a part of the detailed description. The drawings show, by way of illustration, specific examples that may be practiced. These examples are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other examples may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as examples may feature a subset of said features. Further, examples may include fewer features than those disclosed in a particular example. Thus, the following claims are hereby incorporated into the Detailed Description, with a claim standing on its own as a separate example. The scope of the examples disclosed herein is to be determined with reference to the appended claims, along with the full scope of equivalents to which such claims are entitled.

What is claimed is:

1. A system for detecting anomalous user interactions with a computing resource, the system comprising:
   a processor; and
   a memory communicatively coupled to the processor and configured with instructions, which cause the processor to perform operations comprising:
      receiving a request to monitor interactions of a user with the computing resource, the interactions comprising causing the computing resource to execute an operation to access data objects hosted by a storage resource that is coupled to the computing resource;
      obtaining first event data from the computing resource, the first event data comprising information that is indicative of first interactions of the user with the computing resource prior to receiving the request;
      obtaining second event data from the computing resource, the second event data comprising information that is indicative of second interactions of the user with the computing resource after receiving the request;
      identifying a security risk, the security risk based on analysis of past interactions of the user;
      determining a metric based on the security risk of the user;
      adjusting the metric based on an identified change in the security risk of the user;
      determining, based on the first event data and the second event data, whether a deviation between the first interactions and the second interactions satisfies an indicated criteria, the indicated criteria including the metric determined based on the identified change in the security risk of the user; and
      generating a security alert based on the determination.

2. The system of claim 1, wherein adjusting the metric comprises at least one of:
   scaling or offsetting numerical values used to evaluate the first event data and the second event data; or
   adjusting the indicated criteria.

3. The system of claim 1, wherein identifying the change in the security risk of the user comprises determining that the deviation between the first interactions and the second interactions satisfies an indicated criteria.

4. The system of claim 1, wherein the instructions further cause the processor to perform operations comprising:
   receiving, from the computing resource prior to receiving the request, historic event data comprising the first event data; and
   generating a database comprising the historic event data.

5. The system of claim 1, wherein the computing resource comprises at least one of an endpoint device, a hosted computing environment, a computing server, or a cloud-based computing environment.

6. The system of claim 1, wherein the storage resource comprises at least one of a hard disk drive, a removable storage device, a network-based storage system, or a cloud-based storage drive.

7. The system of claim 1, the interactions of the user with the computing resource comprises at least one of:
   a user executed operation to read a data object,
   a user executed operation to transmit a data object to a remote computing system, or
   a user executed operation to copy a data object to a removeable storage device.

8. The system of claim 1, wherein to determine whether the deviation between the first interactions and the second interactions satisfies an indicated criteria, the instructions cause the processor to perform operations comprising:
   generating, using the first event data, a data model that is configured to predict how the user will interact with the computing system at a future time; and
   evaluating a prediction of the data model against the second event data.

9. The system of claim 1, wherein to generate the security alert, the instructions cause the processor to perform operations comprising:
   causing presentation, on an interface of a second computing resource, a report comprising at least one of an indicator of an interaction from the second interactions that is associated with the second event data that caused the deviation, an indicator of a metric used to determine the deviation, or metadata associated with the interaction.

10. The system of claim 1, wherein the instructions further cause the processor to perform operations comprising:
    allocating the first event data between a first signal-to-noise ratio category and a second signal-to-noise ratio category based on a likelihood that the first event data is indicative of interactions that pose a security risk; and
    generating a security alert based on the allocation.

11. The system of claim 10, wherein the instructions further cause the processor to perform operations comprising:
    determining a risk score of the user based on a first value that is derived from the first event data that is allocated to the first signal-to-noise ratio category and a second value that is derived from the first event data that is allocated to the second signal-to-noise ratio category.

12. The system of claim 11, wherein the instructions further cause the processor to perform operations comprising determining the risk score based on an employment status or a security status of the user.

13. A method for detecting anomalous user interactions with a hosted computing environment, the method comprising:
    identifying a triggering event that initiates an investigation of a user of a hosted computing environment;
    obtaining first event data that are indicative of first data access operations executed by the hosted computing environment on the behalf of the user prior to the triggering event;
    obtaining second event data that are indicative of second data access operations executed by the hosted computing environment on behalf of the user after the triggering event;
    identifying a security risk, the security risk based on analysis of past interactions of the user;
    determining a metric based on the security risk of the user;

adjusting the metric based on an identified change in the security risk of the user;
generating a security risk model based on the first event data and the security risk, the security risk model including the metric determined based on the identified change in the security risk of the user, and the security risk model configured to predict how the user will access data using the hosted computing environment after the triggering event;
identifying, based on the security risk model including the metric determined based on an identified change in the security risk of the user and the second event data, a change in a pattern of data access operations executed by the hosted computing environment on the behalf of the user; and
generating a security alert based on the change the pattern of data access operations.

14. The method of claim 13, further comprising:
identifying, based on the first event data, an anomalous data access operation executed by the hosted computing environment on behalf of the user, the anomalous data access operation executed prior to the triggering event; and
generating the security alert based on the anomalous operations.

15. The method of claim 13, further comprising:
identifying an anomalous data access operation in the second data access operations based on the change in the pattern of data access operations;
wherein the security alert comprises event data associated with the anomalous data access operation.

16. The method of claim 13, wherein the first data access operations or the second data access operations comprise:
a user executed operation to read a data object,
a user executed operation to transmit a data object to a remote computing system, or
a user executed operation to copy a data object to a removeable storage device.

17. A non-transitory machine-readable medium comprising instructions, which when executed by a machine, causes the machine to perform operations comprising:
receiving a request to monitor data access operations executed by user of an endpoint device, the data access operations comprising causing the endpoint device to execute an operation to access data objects hosted by a storage resource that is coupled to the endpoint device;
obtaining first event data from the endpoint device, the first event data comprising information that is indicative of first data access operations executed by the user of the endpoint device prior to receiving the request;
obtaining second event data from the endpoint device, the second event data comprising information that is indicative of second access operations executed by the user of the endpoint device after receiving the request;
identifying a security risk, the security risk based on analysis of past interactions of the user;
determining a metric based on the security risk of the user;
adjusting the metric based on an identified change in the security risk of the user;
determining, based on the first event data and the second event data, whether a deviation between the first data access operations and the second data access operations satisfies an indicated criteria, the indicated criteria including the metric determined based on the identified change in the security risk of the user; and
generating a security alert based on the determination.

18. The non-transitory machine-readable medium of claim 17, the operations further comprising:
generating, using the first event data, a data model that is configured to predict data access operations the user will likely execute using the endpoint device at a future time; and
evaluating a prediction of the data model against the second event data to identify a data access operation executed by the user using the endpoint device that deviates from the prediction;
wherein the security alert comprises event data that is associated with the identified data access operation.

* * * * *